United States Patent
Tachibana (10) Patent No.: US 8,733,943 B2
(45) Date of Patent: May 27, 2014

(54) IMAGE DISTORTION CORRECTING MECHANISM OF BACK-PROJECTION IMAGE DISPLAY DEVICE AND BACK-PROJECTION IMAGE DISPLAY DEVICE

(75) Inventor: Toshitaka Tachibana, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/902,747

(22) Filed: Sep. 25, 2007

(65) Prior Publication Data

US 2008/0284986 A1 Nov. 20, 2008

(30) Foreign Application Priority Data

May 18, 2007 (JP) .................................. 2007-132230

(51) Int. Cl.
| | |
|---|---|
| *G03B 21/00* | (2006.01) |
| *G03B 21/14* | (2006.01) |
| *G03B 21/22* | (2006.01) |
| *G03B 21/28* | (2006.01) |
| *H04N 3/23* | (2006.01) |
| *G02B 5/08* | (2006.01) |
| *G02B 7/182* | (2006.01) |

(52) U.S. Cl.
USPC ................. 353/69; 353/98; 353/77; 348/746; 359/846

(58) Field of Classification Search
USPC ........... 353/69, 70, 98, 99, 77, 78, 46, 47, 50, 353/51; 359/846, 847; 348/746
See application file for complete search history.

(56) References Cited

U.S. PATENT DOCUMENTS

| | | | | |
|---|---|---|---|---|
| 7,370,976 | B2 * | 5/2008 | Fujinuma | 353/69 |
| 7,396,133 | B2 * | 7/2008 | Burnett et al. | 353/69 |
| 2004/0201594 | A1 * | 10/2004 | Nashida et al. | 345/647 |
| 2006/0215126 | A1 * | 9/2006 | Saito | 353/69 |
| 2007/0195441 | A1 * | 8/2007 | Aizawa et al. | 359/871 |

FOREIGN PATENT DOCUMENTS

| | | | |
|---|---|---|---|
| JP | 10307202 A | * | 11/1998 |
| JP | 11-24166 A | | 1/1999 |
| JP | 2001-42281 A | | 2/2001 |
| JP | 2002-077777 A | | 3/2002 |
| JP | 2004-309529 A | | 11/2004 |
| JP | 2005-208378 A | | 8/2005 |
| JP | 2005-284028 A | | 10/2005 |
| JP | 2007-68112 A | | 3/2007 |

OTHER PUBLICATIONS

Takauchi, JP10-307202, Machine translation in English, Nov. 17, 1998.*

* cited by examiner

*Primary Examiner* — William C Dowling
*Assistant Examiner* — Ryan Howard
(74) *Attorney, Agent, or Firm* — Birch, Stewart, Kolasch & Birch, LLP.

(57) ABSTRACT

In a back-projection image display device, image light outputted from a projection device is reflected by a reflection mirror held by a base frame and projected onto the back of a screen, to display an image on the screen. An image distortion correcting mechanism includes adjustment mechanisms that deform the reflection mirror, drive units that generate driving force necessary for the deformation of the reflection mirror by the adjustment mechanisms, and a control substrate that supplies power to the drive units. The control substrate supplies power to the drive units in response to a control signal supplied from a remote control unit. This allows pin distortion and barrel distortion, as well as trapezial distortion to be corrected by remote control in the back-projection image display device.

5 Claims, 13 Drawing Sheets

IMAGE DISTORTION CORRECTING MECHANISM OF BACK-PROJECTION IMAGE DISPLAY DEVICE AND BACK-PROJECTION IMAGE DISPLAY DEVICE

BACKGROUND OF THE INVENTION

1. Field of the Invention

The present invention relates to image distortion correcting mechanisms of back-projection image display devices and back-projection image display devices.

2. Description of the Background Art

In a back-projection image display device in which image light outputted from a projection device is reflected by a reflection mirror and projected onto the back of a screen, an image displayed on the screen can be adjusted by adjusting the position of the projection device using a position adjuster (six-axis adjuster). For example, an image displayed on the screen can be moved vertically and horizontally, rotated, and zoomed in or out. Vertical trapezoidal distortion and horizontal trapezoidal distortion that cause an image which should be a rectangle to become an isosceles trapezoid can also be corrected.

However, such image adjustment using a position adjuster cannot correct pin distortion that causes an image which should be a rectangle to be shaped like a pincushion or barrel distortion that causes an image which should be a rectangle to be shaped like a barrel, which occur due to the characteristics of a projection lens and distortion of a reflection mirror. Trapezial distortion that causes an image which should be a rectangle to become a trapezium cannot be corrected either.

For this reason, attempts have been made to correct these types of image distortion by deforming a reflection mirror in a back-projection image display device. By way of examples, Japanese Patent Application Laid-Open No. 2002-077777 discloses a technique of correcting pin distortion and barrel distortion by deforming a reflection mirror, and Japanese Patent Application Laid-Open No. 2004-309529 discloses a technique of correcting trapezial distortion by deforming a reflection mirror.

However, the back-projection image display devices of JP 2002-077777 and 2004-309529 are problematic because their image adjustment operations are not easy. For example, when one operator engages in the image adjustment, the operator has to leave the back-projection image display device to check an image displayed on the screen each time an adjustment is made to the image in the display device. To avoid such troublesome effort, two operators have to be kept for the image adjustment.

This problem becomes noticeable particularly when adjusting an image in order to join the connecting point of images displayed on adjacent screens in an image display device having a combination of a plurality of back-projection image display devices.

SUMMARY OF THE INVENTION

It is an object of the present invention to provide an image distortion correcting mechanism of a back-projection image display device capable of correcting image distortion easily, and a back-projection image display device.

In a first aspect of the present invention, an image distortion correcting mechanism of a back-projection image display device includes: a projection device which outputs image light; a reflection mirror which reflects the image light outputted from the projection device; a screen which receives the image light reflected by the reflection mirror, the image light being projected onto the back of the screen; and a base which holds the reflection mirror, and the mechanism includes: an adjustment unit which deforms the reflection mirror; a drive unit which generates driving force necessary for the deformation of the reflection mirror by the adjustment unit in response to supplied power; and a supply unit which supplies power to the drive unit in response to a control signal supplied from a remote control device.

Image distortion can be corrected away from the back-projection image display device, resulting in easy correction of the image distortion.

In a second aspect of the present invention, a back-projection image display device includes: a projection device which outputs image light; a reflection mirror which reflects the image light outputted from the projection device; a screen which receives the image light reflected by the reflection mirror, the image light being projected onto the back of the screen; a base which holds the reflection mirror; an adjustment unit which deforms the reflection mirror; a drive unit which generates driving force necessary for the deformation of the reflection mirror by the adjustment unit in response to supplied power; and a supply unit which supplies power to the drive unit in response to a control signal supplied from a remote control device.

Image distortion can be corrected away from the back-projection image display device, resulting in easy correction of the image distortion.

These and other objects, features, aspects and advantages of the present invention will become more apparent from the following detailed description of the present invention when taken in conjunction with the accompanying drawings.

DESCRIPTION OF THE PREFERRED EMBODIMENTS

1 First Preferred Embodiment

1.1 Outline of Back-Projection Image Display Device 1

Figure 1:
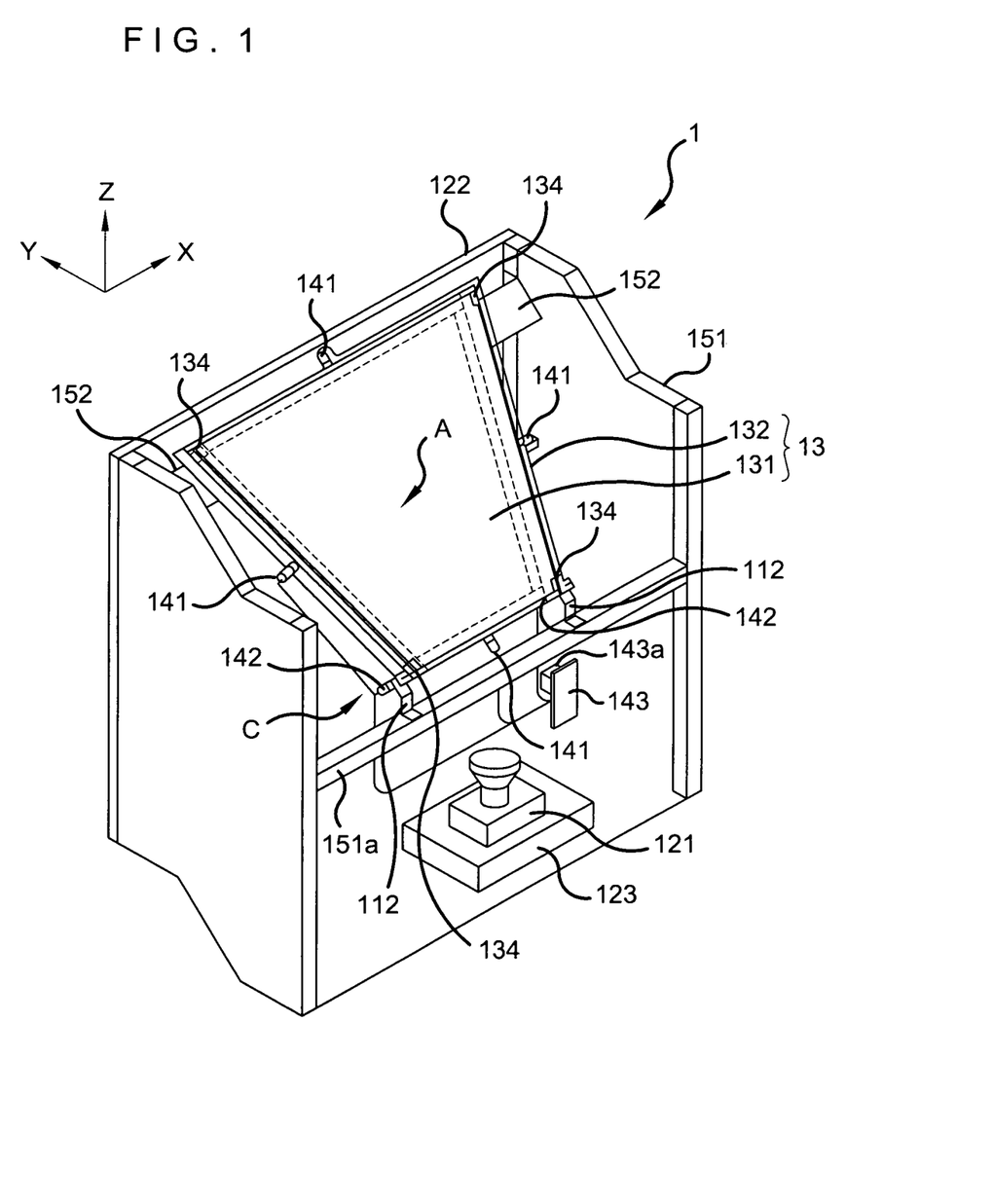
FIG. 1 is a transparent perspective view of a back-projection image display device according to a first preferred embodiment.

FIG. 1 is a transparent perspective view of a back-projection image display device 1 according to a first preferred embodiment of the present invention. For convenience of explanation, XYZ orthogonal coordinate systems are defined in FIG. 1 with a ±X direction as a horizontal direction, a ±Y direction as a back-and-forth direction, and a ±Z direction as a vertical direction.

As depicted in FIG. 1, the back-projection image display device 1 includes a projection device 121, a reflection mirror 131, a screen 122 and a base frame 132. Image light outputted from the projection device 121 is reflected by the reflection mirror 131 held by the base frame 132 and projected onto the back of the screen 122, to display an image on the screen 122. This back-projection image display device 1 is also called a "rear projector". The back-projection image display device 1 is provided with an image distortion correcting mechanism 14 that corrects pin distortion, barrel distortion and trapezial distortion by deforming the reflection mirror 131.

1.2 Outline of Image Distortion Correcting Mechanism 14

Figure 2:
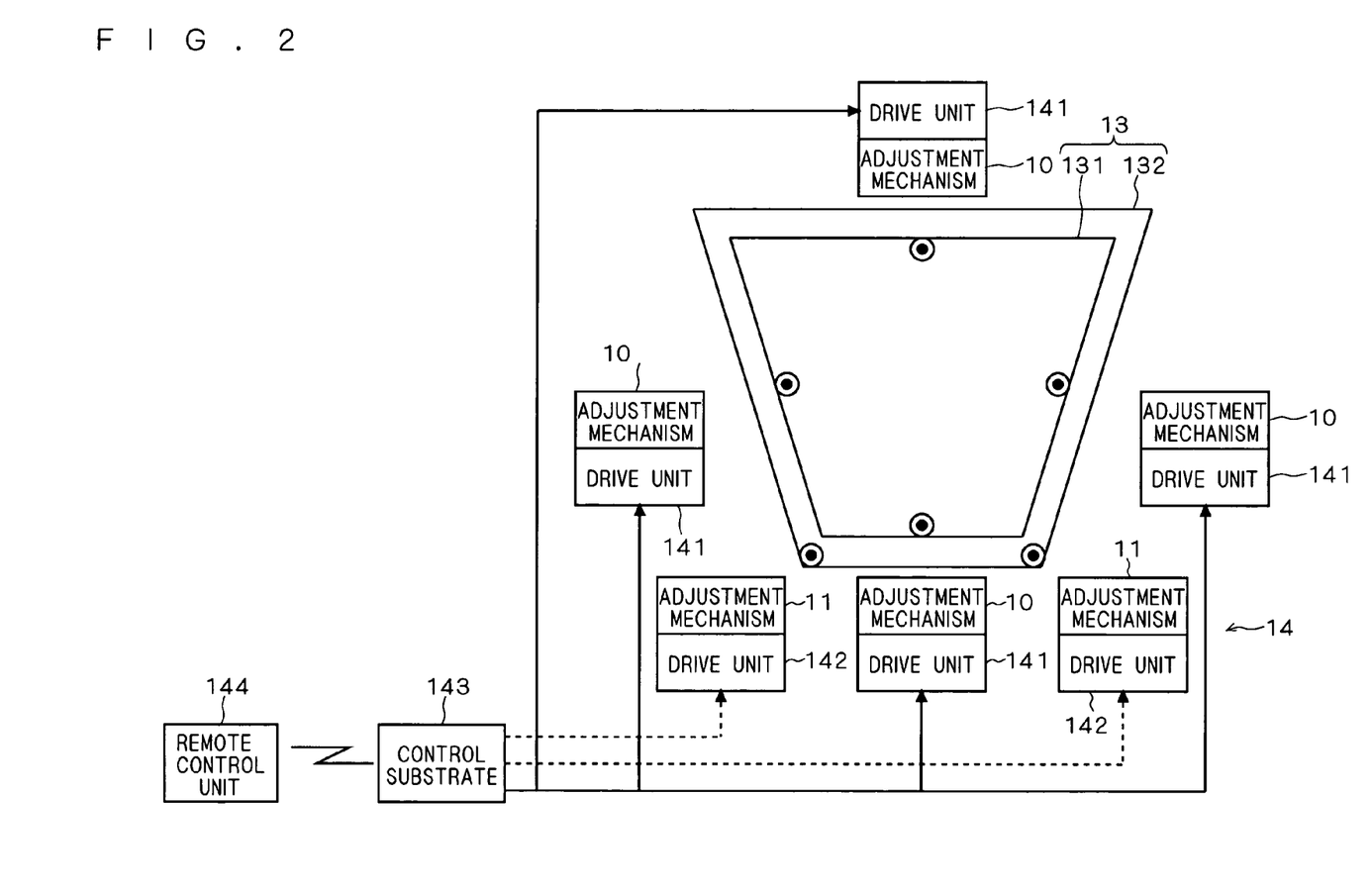
FIG. 2 is a block diagram of an image distortion correcting mechanism.

FIG. 2 is a block diagram of the image distortion correcting mechanism 14.

As depicted in FIG. 2, the image distortion correcting mechanism 14 includes adjustment mechanisms 10 and 11 that deform the reflection mirror 131, drive units 141 and 142 that generate driving force necessary for the deformation of the reflection mirror 131 by the adjustment mechanisms 10 and 11, and a control substrate 143 that supplies power to the drive units 141 and 142.

Figure 3:
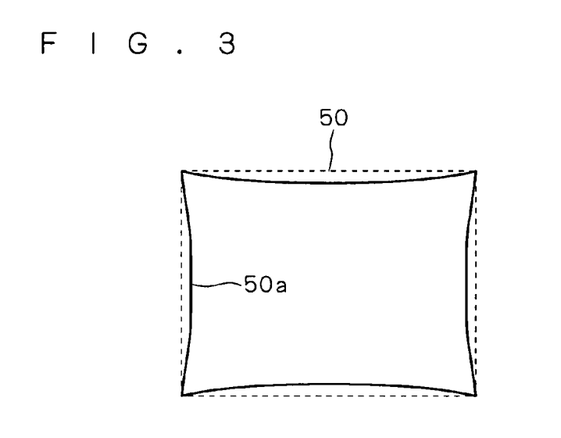
FIG. 3 illustrates correction of pin distortion.
Figure 4:
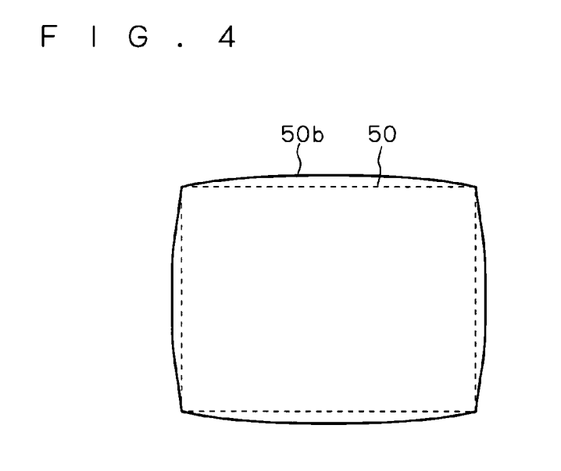
FIG. 4 illustrates correction of barrel distortion.

The four adjustment mechanisms 10 bring the vicinity of the middle point of each of four sides of the reflection mirror 131 closer to the base frame 132 or moving the vicinities away from the base from 132 with the vicinity of each of four vertexes of the reflection mirror 131 in the shape of a trapezoidal plate fixed to the base frame 132 serving as a base to deform the reflection mirror 131 into the shape of a bow, thereby correcting pin distortion and barrel distortion. That is, the adjustment mechanisms 10 can correct an image 50a whose contour is distorted in a pincushion shape (image 50a with pin distortion) into an image 50 without distortion as depicted in FIG. 3, or correct an image 50b whose contour is distorted in a barrel shape (image 50b with barrel distortion) into the image 50 without distortion as depicted in FIG. 4.

Figure 5:
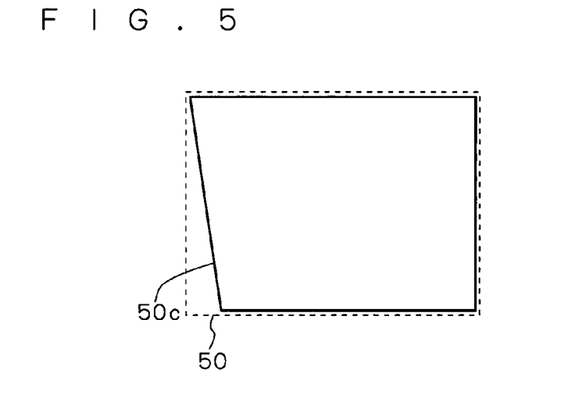
FIG. 5 illustrates correction trapezial distortion.

The two adjustment mechanisms 11 move the base frame 132 in the vicinity of one vertex of the reflection mirror 131 in a direction perpendicular to a main surface of the reflection mirror 131 with the base frame 132 fixed in the vicinity of each of remaining three vertexes of the reflection mirror 131 to twist the reflection mirror 131 along with the base frame 132, thereby correcting trapezial distortion. That is, the adjustment mechanisms 11 can correct an image 50c whose contour is distorted in a trapezium (image 50c with trapezial distortion) into the image 50 without distortion as depicted in FIG. 5. The reflection mirror 131 is twisted along with the base frame 132 to correct both pin distortion and barrel distortion, as well as trapezial distortion.

The four drive units 141 generate driving force necessary for the deformation of the reflection mirror 131 by the adjustment mechanisms 10 in response to supplied power. Likewise, the two drive units 142 generate driving force necessary for the deformation of the reflection mirror 131 by the adjustment mechanisms 11 in response to supplied power.

The control substrate 143 supplies power to the drive units 141 and 142 in response to a control signal supplied from a remote control unit 144. This allows pin distortion, barrel distortion and trapezial distortion to be corrected by remote control in the back-projection image display device 1. In the back-projection image display device 1, therefore, these types of image distortion can be corrected away from the display device 1, resulting in easy correction of these types of image distortion.

1.3 The Details of Back-Projection Image Display Device 1

Referring back to FIG. 1, a detailed description will be given of the back-projection image display device 1 provided with the image distortion correcting mechanism 14.

A cabinet 151 serving as a case of the back-projection image display device 1 has a position adjuster (six-axis adjuster) 123 fixed on its inside bottom surface, with the projection device 121 mounted on the position adjuster 123.

The projection device 121 outputs image light in an upward direction. The projection device 121 may employ a liquid crystal system, the DLP (registered trademark) system, the LCOS (Liquid Crystal On Silicon) system or the like.

The position adjuster 123 is capable of moving the projection device 121 slightly in the ±X direction, ±Y direction, and ±Z direction, and of rotating the projection device 121 slightly around the X-axis, Y-axis and Z-axis. Accordingly, in the back-projection image display device 1, an image displayed on the screen 122 can be moved vertically and horizontally, rotated, and zoomed in or out, and vertical trapezoidal distortion and horizontal trapezoidal distortion that cause an image which should be a rectangle to become an isosceles trapezoid can also be corrected.

A coupled element 13 of the reflection mirror 131 and the base frame 132 is provided above the projection device 121.

The reflection mirror 131 is inclined backward and forward, and reflects image light outputted from the projection device 121 to bend an optical path of the image light.

The base frame 132 holds the reflection mirror 131 from below. By holding the reflection mirror 131 not from above but from below, deformation of the reflection mirror 131 due to its own weight is controlled from below by the adjustment mechanisms 10, thereby easily controlling the curvature of the reflection mirror 131.

The base frame 132 has a framework made of tube materials such as a square pipe material along the contour of the reflection mirror 131. A plate is not employed as the base holding the reflection mirror 131 because a platelike base shields image light when the reflection mirror 131 is held from below.

Both right and left ends on the upper side (front side) of the base frame 132 are coupled to the cabinet 151 by a fastening metal part 152, and both right and left ends on the lower side (back side) of the base frame 132 are coupled to a frame 151a of the cabinet 151 by the adjustment mechanisms 11. The coupling between the both ends on the upper side of the base frame 132 and the cabinet 151 is fixed with no change to their relative position, while the coupling between the both ends on the lower side of the base frame 132 and the cabinet 151 is movable with changes to their relative position.

The base frame 132 possesses higher rigidity than that of the reflection mirror 131. Otherwise the base frame 132 could be deformed when deforming the reflection mirror 131 in order to correct pin distortion and barrel distortion, making it impossible to deform the reflection mirror 131 into the shape of a bow.

Figure 6:
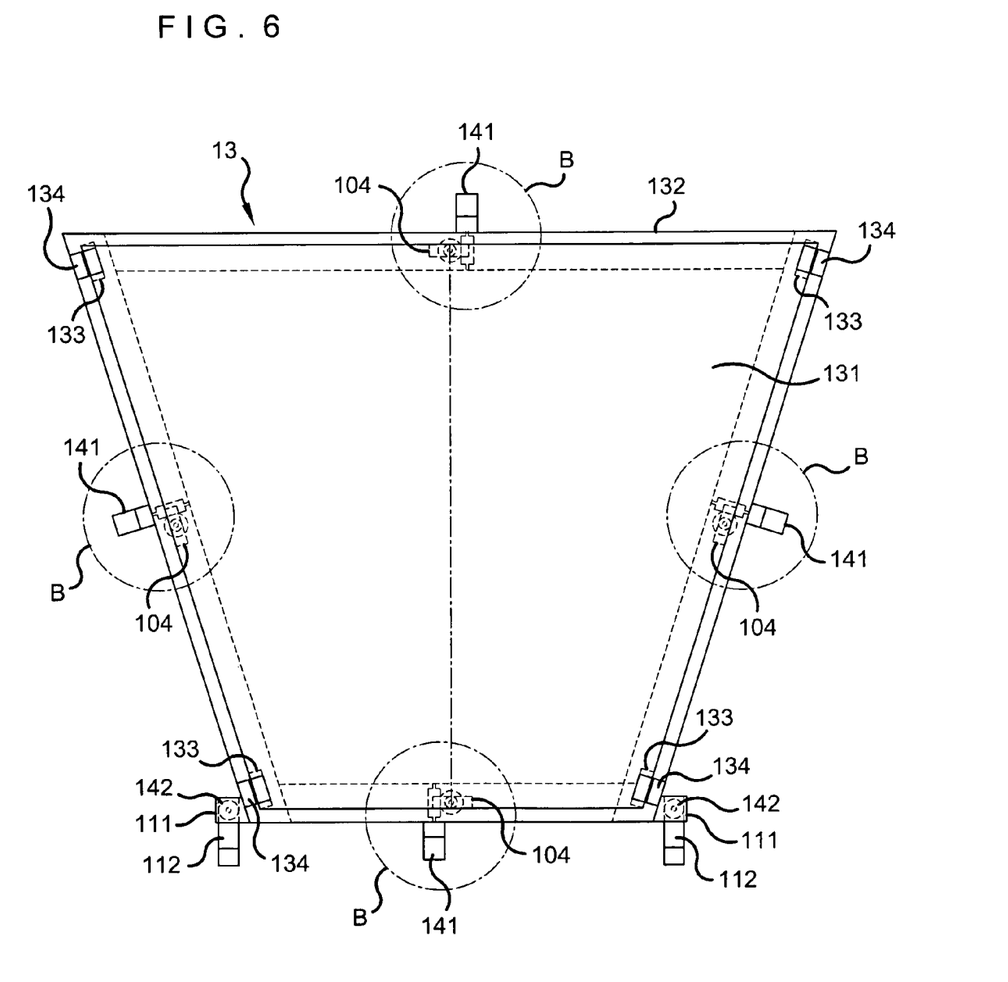
FIG. 6 shows a coupled element seen from the direction A shown in FIG. 1.

FIG. 6 shows the coupled element 13 seen from the direction A shown in FIG. 1. As depicted in FIGS. 1 and 6, the reflection mirror 131 and the base frame 132 are coupled to each other in the vicinities of the four vertexes of the reflection mirror 131. More specifically, the reflection mirror 131 and the base frame 132 are coupled by bonding platelike spacers 133 onto four corners of the base frame 132, placing the reflection mirror 131 on the spacers 133, and pressing the reflection mirror 131 upon the base frame 132 by four fastening metal parts 134 in the shape of a letter Z.

In addition, as depicted in FIG. 1, the screen 122 is vertically installed on the front of the cabinet 151. The image light bent by the reflection mirror 131 is projected onto the back of the screen 122, to display an image regarding the image light on the screen 122. This image can be viewed from the front side of the cabinet 151.

The control substrate 143 includes a light receiving section 143a that receives a control signal supplied by infrared radiation from the remote control unit 144.

1.4 Adjustment Mechanism 10

Figure 7:
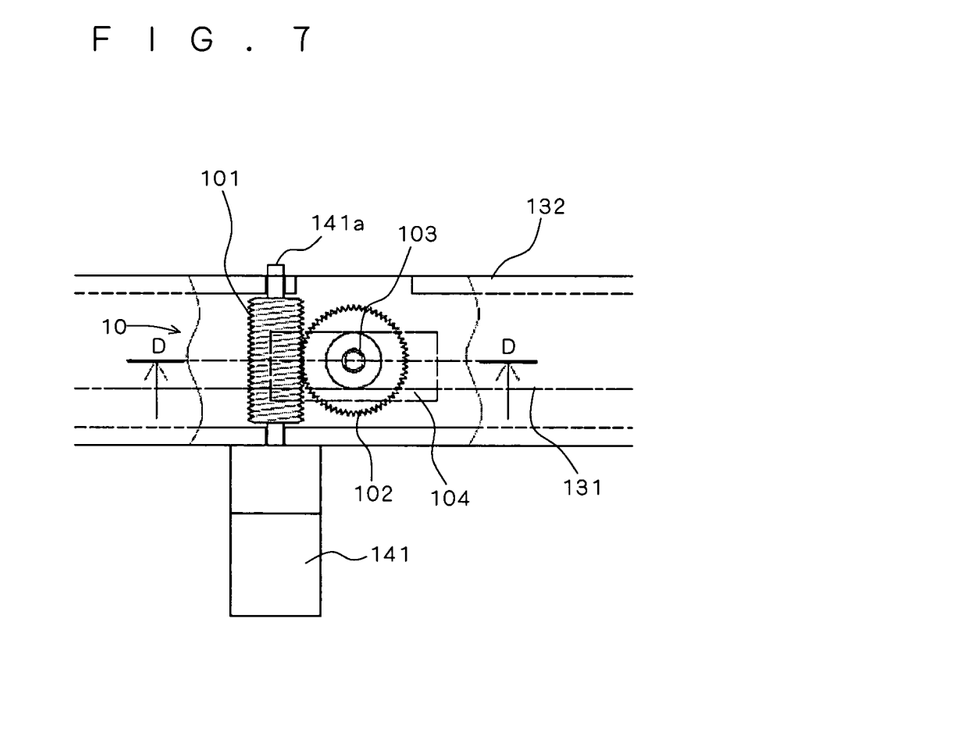
FIG. 7 is a detailed transparent view of a portion B of an adjustment mechanism shown in FIG. 6.
Figure 8:
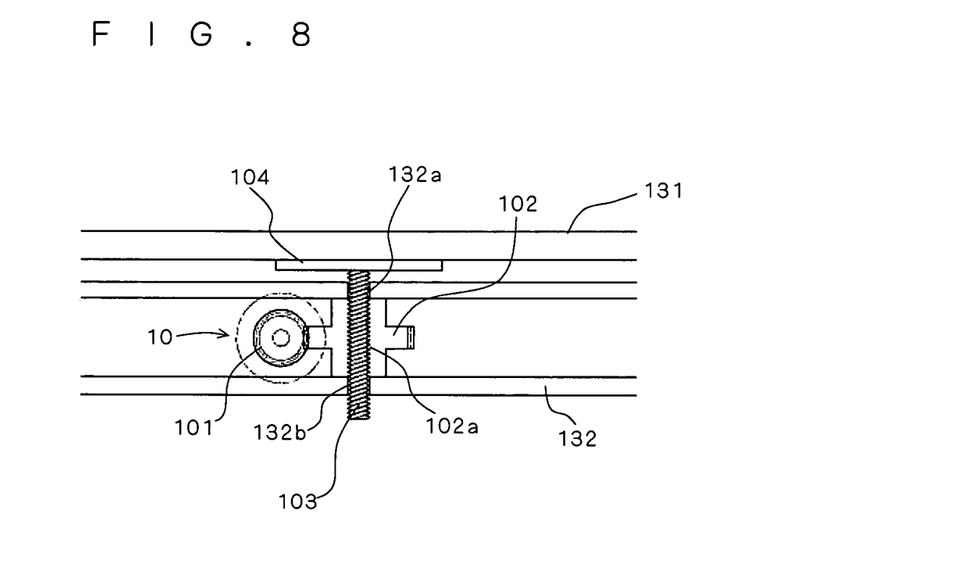
FIG. 8 is a cross-sectional view of the adjustment mechanism taken along the line D-D shown in FIG. 7.

FIGS. 7 and 8 illustrate the adjustment mechanism 10 provided in the vicinity of the middle point of each of the four sides of the reflection mirror 131. FIG. 7 is a detailed transparent view of the portion B shown in FIG. 6, and FIG. 8 is a cross-sectional view taken along the line D-D shown in FIG. 7. The four adjustment mechanisms 10 are similar in structure.

The adjustment mechanism 10 includes a worm gear 101, a worm wheel 102 and an entire screw 103. The adjustment mechanism 10 transmits the rotating driving force generated by the drive unit 141 to the worm wheel 102 via the worm gear 101 to raise or lower the entire screw 103, thus bringing the vicinities of the middle points of the four sides of the reflection mirror 131 closer to the base frame 132 or moving the vicinities away from the base from 132.

The worm wheel 102 is housed in the tube of the base frame 132 with its both ends in contact with the upper and lower interior walls of the base frame 132. The worm wheel 102 is provided with a female screw hole 102a.

The entire screw 103 is screwed into the female screw hole 102a while penetrating round holes 132a and 132b formed in the base frame 132. The entire screw 103 has one end welded to a platelike spacer 104 parallel to the main surface of the reflection mirror 131. The spacer 104 is provided to prevent damage to the reflection mirror 131 resulting from direct contact between the one end of the entire screw 103 and the reflection mirror 131. The spacer 104 has a plate thickness smaller than that of the spacers 133. If the spacer 104 has a thickness larger than that of the spacers 133, the reflection mirror 131 cannot be deformed into the shape of a downwardly convex bow, making it difficult to correct barrel distortion. Meanwhile, the spacer 104 having a thickness smaller than that of the spacers 133 does not hinder the reflection mirror 131 from being deformed into the shape of an upwardly convex bow. The spacer 104 is in contact with a reflection surface (lower main surface) of the reflection mirror 131 while holding the weight of the reflection mirror 131.

The worm gear 101 is housed in the tube of the base frame 132 while being screwed together with the worm wheel 102.

The drive unit 141 is a power source that generates rotating driving force. A geared motor may be employed as the drive unit 141, for example. The drive unit 141 is fixed to an exterior wall of the base frame 132, and a worm gear 101 is pressure-inserted in a rotation axis 141a of the drive unit 141. As depicted in FIG. 1, the respective drive units 141 are connected to the control substrate 143 by electric wires, and can be supplied with power from the control substrate 143.

1.5 Adjustment Mechanism 11

Figure 9:
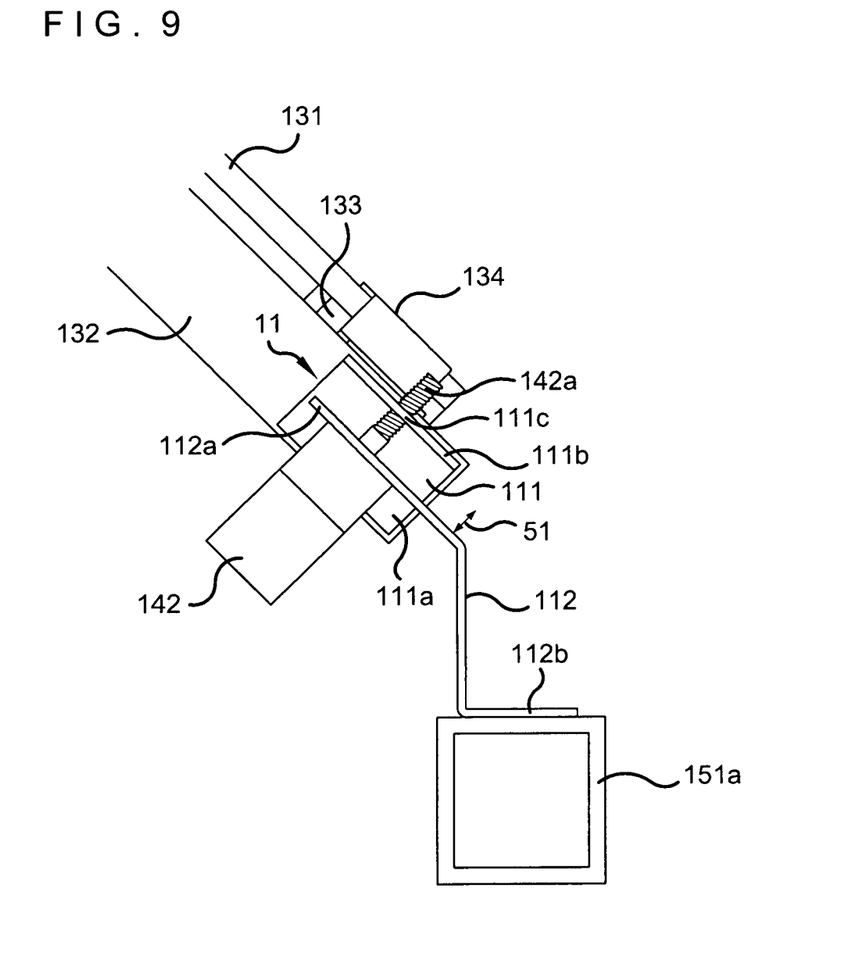
FIG. 9 is a side view of an adjustment mechanism seen from the direction C shown in FIG. 1.

FIG. 9 illustrates the adjustment mechanism 11 provided in the vicinity of each of two vertexes on both right and left ends on the lower side of the reflection mirror 131. FIG. 9 is a side view seen from the direction C shown in FIG. 1. The two adjustment mechanisms 11 are similar in structure, but display bilaterally symmetry.

The adjustment mechanism 11 includes a metal part 111 and a fastening metal part 112. The adjustment mechanism 11 brings the metal part 111 and the fastening metal part 112 closer to each other or moving them away from each other using rotating driving force generated by the drive unit 142, thereby moving the base frame 132 in the vicinity of one vertex of the reflection mirror 131 in a direction 51 perpendicular to the main surface of the reflection mirror 131.

The metal part 111 is in the shape of a letter L, and has a perpendicular portion 111a perpendicular to the main surface of the reflection mirror 131 which is fixed to the exterior wall of the base frame 132, and a parallel portion 111b parallel to the main surface of the reflection mirror 131 which is provided with a female screw hole 111c.

The fastening metal part 112 has an opposed portion 112a opposed to the parallel portion 111b of the metal part 111 which is fixed to the drive unit 142, and a fixed portion 112b opposite to the opposed portion 112a which is fixed to the frame 151a of the cabinet 151.

Like the drive unit 141, the drive unit 142 is a power source that generates rotating driving force. Again, a geared motor may be employed as the drive unit 142, for example. The drive unit 142 has a rotation axis 142a provided with a male screw. The rotation axis 142a is screwed into the female screw hole 111c. As depicted in FIG. 1, the respective drive units 142 are connected to the control substrate 143 by electric wires, and can be supplied with power from the control substrate 143.

1.6 Correction of Pin Distortion and Barrel Distortion

A description is given of the operation of correcting pin distortion and barrel distortion by the image distortion correcting mechanism 14.

When correcting pin distortion, the light receiving section 143a of the control substrate 143 first receives a control signal supplied from the remote control unit 144, and the control substrate 143 supplies power to all of the four drive units 141. This causes the rotation axes 141a of the four drive units 141 to rotate in synchronization with one another. Because this rotation is transmitted to the worm wheel 102 via the worm gear 101 as mentioned above, the four entire screws 103 rise in synchronization with one another in response to the power supply to the drive units 141, raising the vicinities of the middle points of the four sides of the reflection mirror 131 in contact with the spacers 104 upward in synchronization with one another. The reflection mirror 131 is thus deformed into the shape of an upwardly convex bow. Such curvature of the reflection mirror 131 extends optical paths of image light reflected in the vicinities of the middle points of the four sides of the reflection mirror 131 to extend projection distance, thus correcting the pin distortion.

On the other hand, when correcting barrel distortion, the light receiving section 143a of the control substrate 143 first receives a control signal supplied from the remote control unit 144, and the control substrate 143 supplies power to all of the four drive units 141. This causes the rotation axes 141a of the four drive units 141 to rotate in synchronization with one another. The direction of rotation of the rotation axes 141a when correcting barrel distortion is opposite to that when correcting pin distortion. Because this rotation is transmitted to the worm wheel 102 via the worm gear 101 as mentioned above, the four entire screws 103 fall in synchronization with one another in response to the power supply to the drive units 141, lowering the vicinities of the middle points of the four sides of the reflection mirror 131 in contact with the spacers 104 downward due to its own weight in synchronization with one another. The reflection mirror 131 is thus deformed into the shape of a downwardly convex bow. Such curvature of the reflection mirror 131 shortens optical paths of image light reflected in the vicinities of the middle points of the four sides of the reflection mirror 131 to shorten projection distance, thus correcting the barrel distortion.

Figure 10:
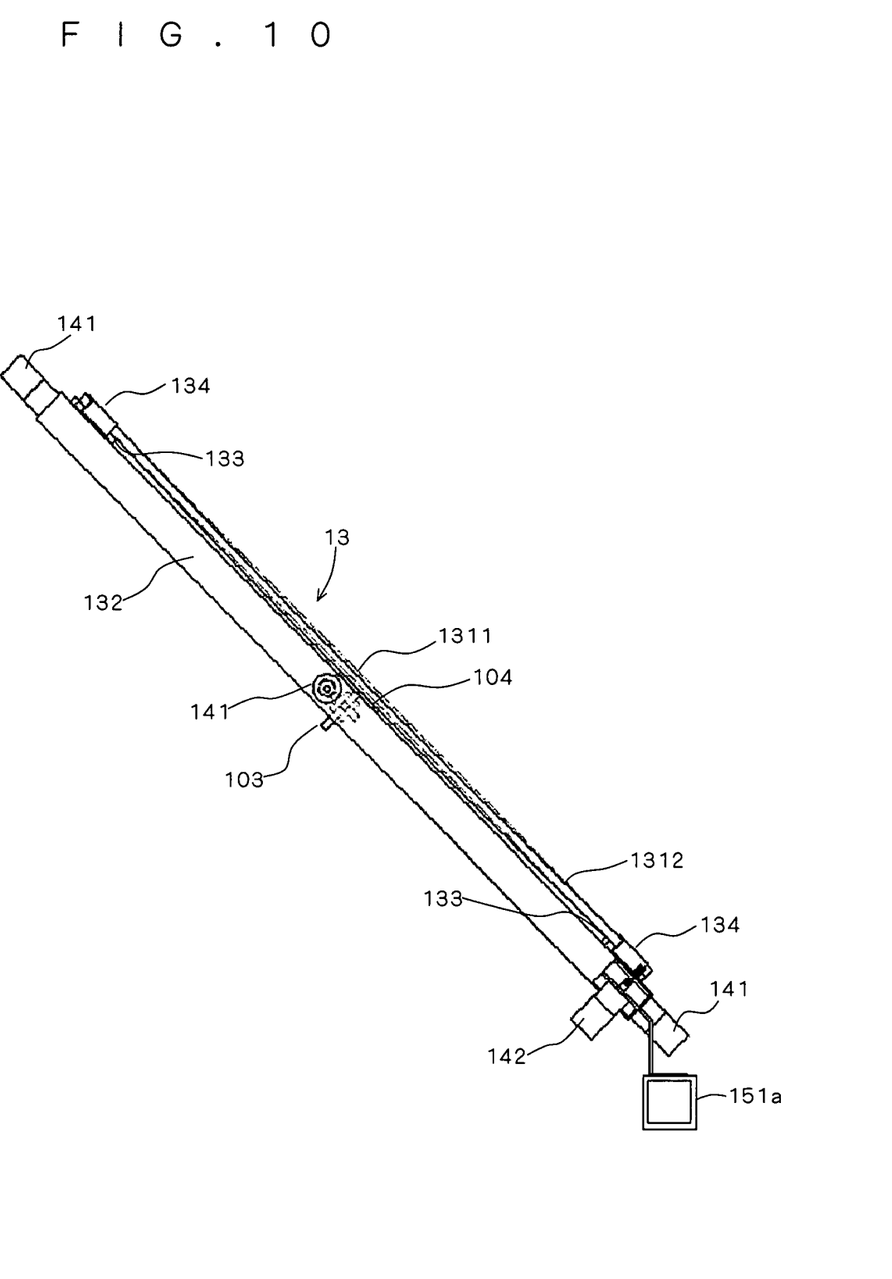
FIG. 10 is a side view of a coupled element before and after correcting barrel distortion.

FIG. 10 is a side view of the coupled element 13 before and after correcting barrel distortion. In the drawing, a reflection mirror 1311 before correcting barrel distortion is indicated by dashed lines, and a reflection mirror 1312 after the correction by solid lines.

1.7 Correction of Trapezial Distortion

A description is given of the operation of correcting trapezial distortion by the image distortion correcting mechanism 14.

When correcting trapezial distortion which occurred in the lower right of an image, the light receiving section 143a of the control substrate 143 first receives a control signal supplied from the remote control unit 144, and the control substrate 143 supplies power to the drive unit 142 on the right end on the lower side. This causes the rotation axis 142a of the drive unit 142 on the right end on the lower side to rotate in a counterclockwise direction. By this rotation, the parallel portion 111b of the metal part 111 and the opposed portion 112a of the fastening metal part 112 move away from each other in the adjustment mechanism 11 on the right end on the lower side, moving the base frame 132 in the vicinity of a vertex on the right end on the lower side of the reflection mirror 131 in a direction perpendicular to the main surface of the reflection mirror 131, causing the vicinity of the vertex on the right end on the lower side of the reflection mirror 131 to be twisted and detached from the plane. Such curvature of the reflection mirror 131 extends an optical path of image light reflected in the vicinity of the vertex on the right end on the lower side of the reflection mirror 131 to extend projection distance, thus correcting the trapezial distortion in the lower right of an image.

When correcting trapezial distortion which occurred in the lower left of an image, the light receiving section 143a of the control substrate 143 first receives a control signal supplied from the remote control unit 144, and the control substrate 143 supplies power to the drive unit 142 on the left end on the lower side.

Figure 11:
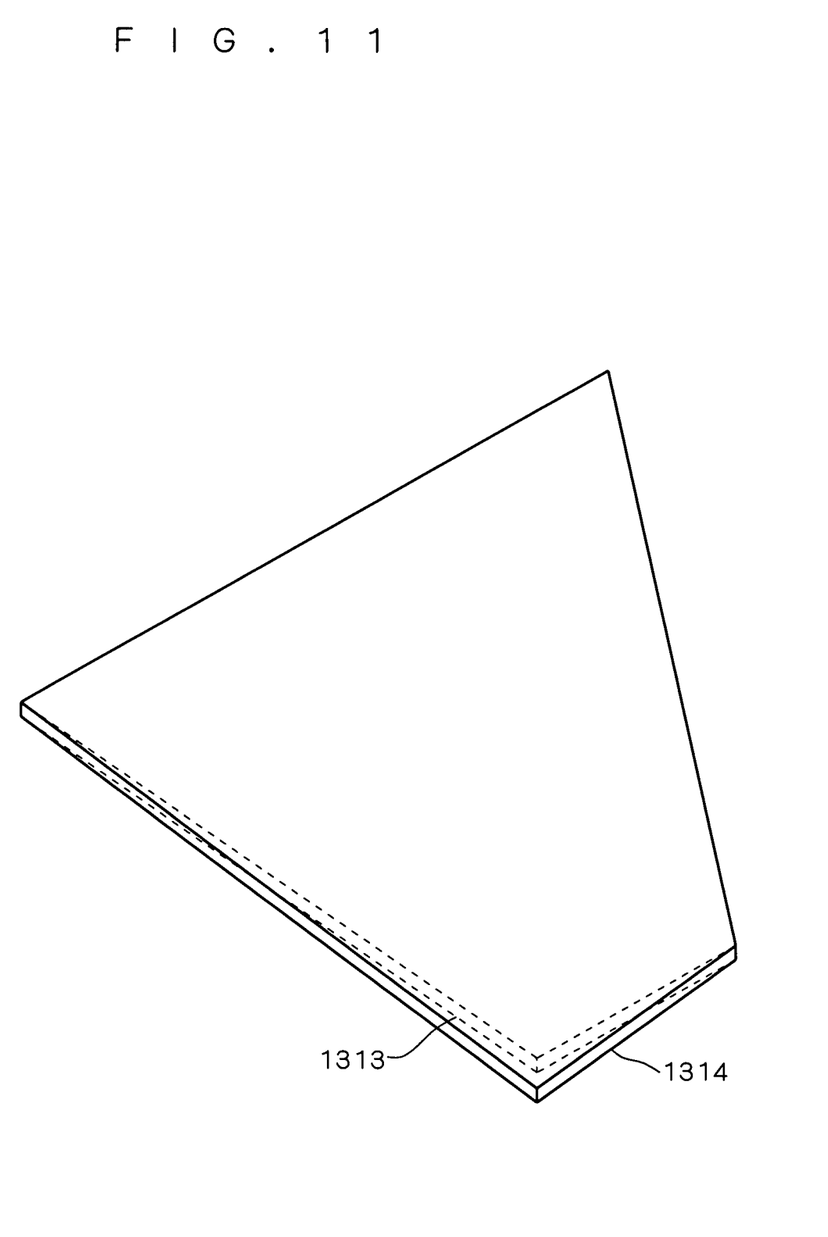
FIG. 11 is a perspective view of a reflection mirror before and after correcting trapezial distortion.

FIG. 11 is a perspective view of the reflection mirror 131 before and after correcting trapezial distortion. In the drawing, a reflection mirror 1313 before correcting trapezial distortion is indicated by dashed lines, and a reflection mirror 1314 after the correction by solid lines.

1.8 Multiprojector M

Figure 12:
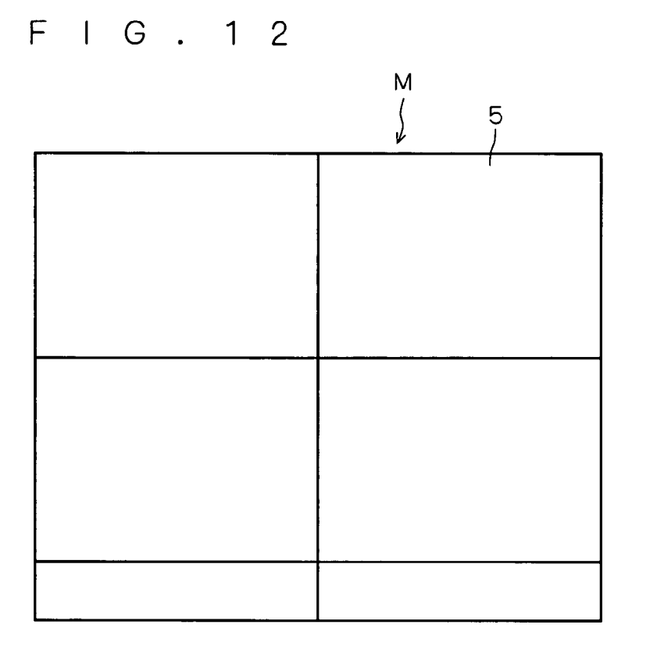
FIG. 12 is a frontal view of a multiprojector.
Figure 13:
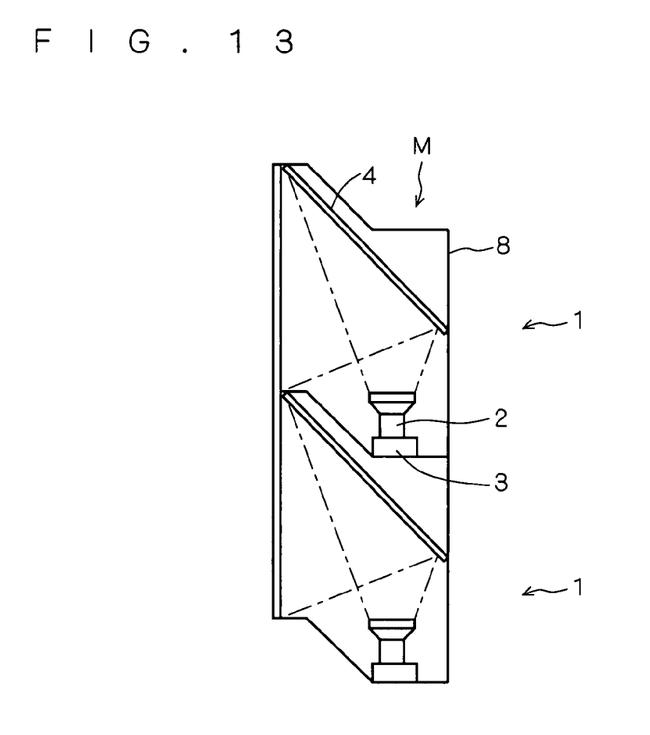
FIG. 13 is a cross-sectional view of the multiprojector.

The back-projection image display device 1 as described above can be used alone, or in combination with at least one other back-projection image display device 1. By way of example, FIGS. 12 and 13 illustrate a multiprojector M having four back-projection image display devices 1 arranged top and bottom and right and left to form one big screen. FIG. 12 is a frontal view of the multiprojector M, and FIG. 13 is a cross-sectional view of the same. In the multiprojector M, images displayed on the screens 122 of the four back-projection image display devices 1 are combined to form one multi-image.

2 Second Preferred Embodiment

2.1 Adjustment Mechanism 20

Figure 14:
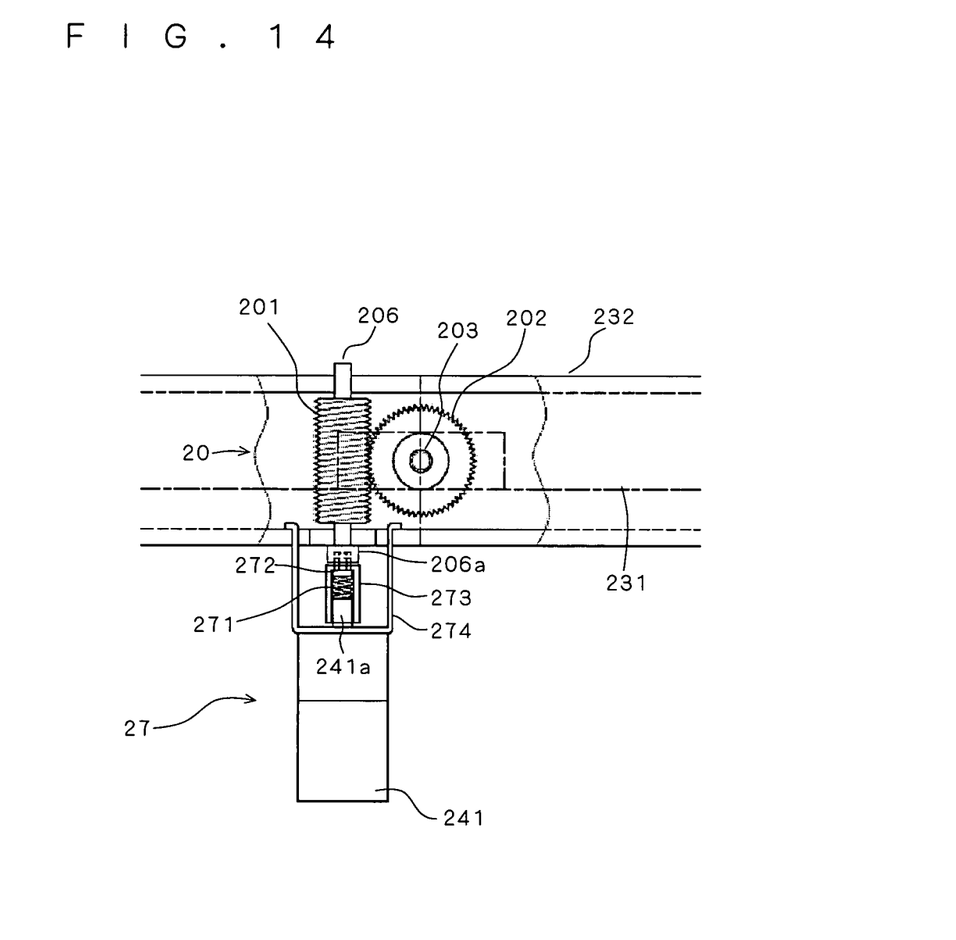
FIG. 14 is a detailed transparent view of an adjustment mechanism.
Figure 15:
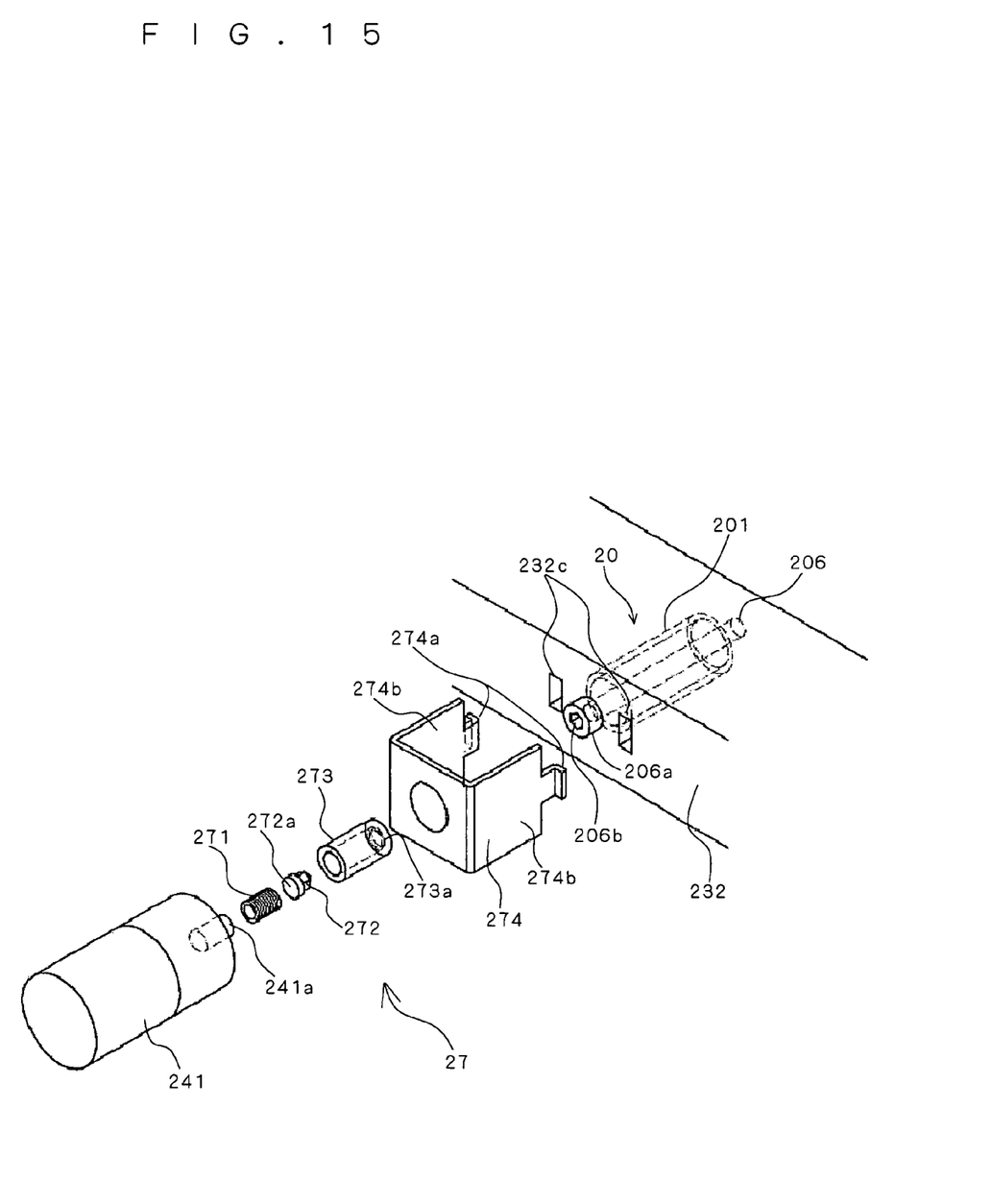
FIG. 15 is a disassembled perspective view of the adjustment mechanism.

FIGS. 14 and 15 illustrate an adjustment mechanism 20 according to a second preferred embodiment that can be used instead of the adjustment mechanism 10 according to the first preferred embodiment. FIG. 14 is a detailed transparent view corresponding to FIG. 7, and FIG. 15 is a disassembled perspective view. In FIGS. 14 and 15, the elements that correspond to those elements forming the back-projection image display device 1 have the same reference numerals as those elements, but with a "2" instead of a "1" at the beginning.

Like the adjustment mechanism 10, the adjustment mechanism 20 includes a worm gear 201, a worm wheel 202 and an entire screw 203. And like the adjustment mechanism 10, the adjustment mechanism 20 transmits rotating driving force generated by a drive unit 241 to the worm wheel 202 via the worm gear 201 to raise or lower the entire screw 203, thus bringing the vicinities of the middle points of four sides of a reflection mirror 231 closer to a base frame 232 or moving the vicinities away from the base from 232.

However, the adjustment mechanism 20 is different from the adjustment mechanism 10 in that a removable drive unit 27 including the drive unit 241 is removable with respect to the adjustment mechanism 20. Since the drive unit 241 used only when correcting image distortion does not need to be provided for all individuals of the back-projection image display device 1, the removable drive unit 27 is rendered removable to simplify the back-projection image display device 1.

To make the removable drive unit 27 removable, the worm gear 201 is pressure-inserted in a shaft 206 held by the base frame 232 in a rotatable manner. The shaft 206 has one end provided with a flange part 206a in which a hexagonal hole 206b is formed toward the removable drive unit 27.

The removable drive unit 27 includes, in addition to the drive unit 241, a compression spring 271, a bit 272, a bit holder 273 and a holding metal part 274. The removable drive unit 27 transmits rotating driving force generated by the drive unit 241 to the shaft 206 via the bit holder 273 and the bit 272.

The compression spring 271 has one end pressure-welded to the end of a rotation axis 241a of the drive unit 241, and the other end pressure-welded to a flange 272a of the bit 272. The compression spring 271 is housed in the tube of the bit holder 273 while being compressed. The compression spring 271 applies reaction force to the bit 272.

The bit 272 has a hexagonal column shape, and has one end provided with the flange 272a in the shape of a disc. The bit 272 is inserted in a hexagonal hole 273a formed in one end of the bit holder 273, and will not be detached from the bit holder 273 because the flange 272a has a diameter larger than the hexagonal hole 273a.

The bit holder 273 has the other end pressure-inserted in the rotation axis 241a of the drive unit 241.

The holding metal part 274 has an almost square U-shape, and is made of a spring material such as stainless steel. The holding metal part 274 is removably attached to the base frame 232 by engaging click parts 274a at the end in rectangular holes 232c formed in the base frame 232. The drive unit 241 is fixed to the holding metal part 274.

When the bit 272 and the hexagonal hole 206b are out of phase, the other end of the bit 272 does not project from the hexagonal hole 273a. However, when the bit 272 comes in phase with the hexagonal hole 206b by rotation of the rotation axis 241a of the drive unit 241, the other end of the bit 272 projects from the hexagonal hole 273a by reaction force applied from the compression spring 271 to fit into the hexagonal hole 206b, thus being capable of transmitting rotation. If the bit 272 comes in phase with the hexagonal hole 206b coincidentally when attaching the removable drive unit 27, the other end of the bit 272 naturally fits into the hexagonal hole 206b upon attaching the removable drive unit 27, and is thus capable of transmitting rotation.

When demounting the removable drive unit 27 from the base frame 232, both side surfaces 274b of the holding metal part 274 are pressed from outside to release the engagement between the click parts 274a and the rectangular holes 232c.

2.2 Adjustment Mechanism 21

Figure 16:
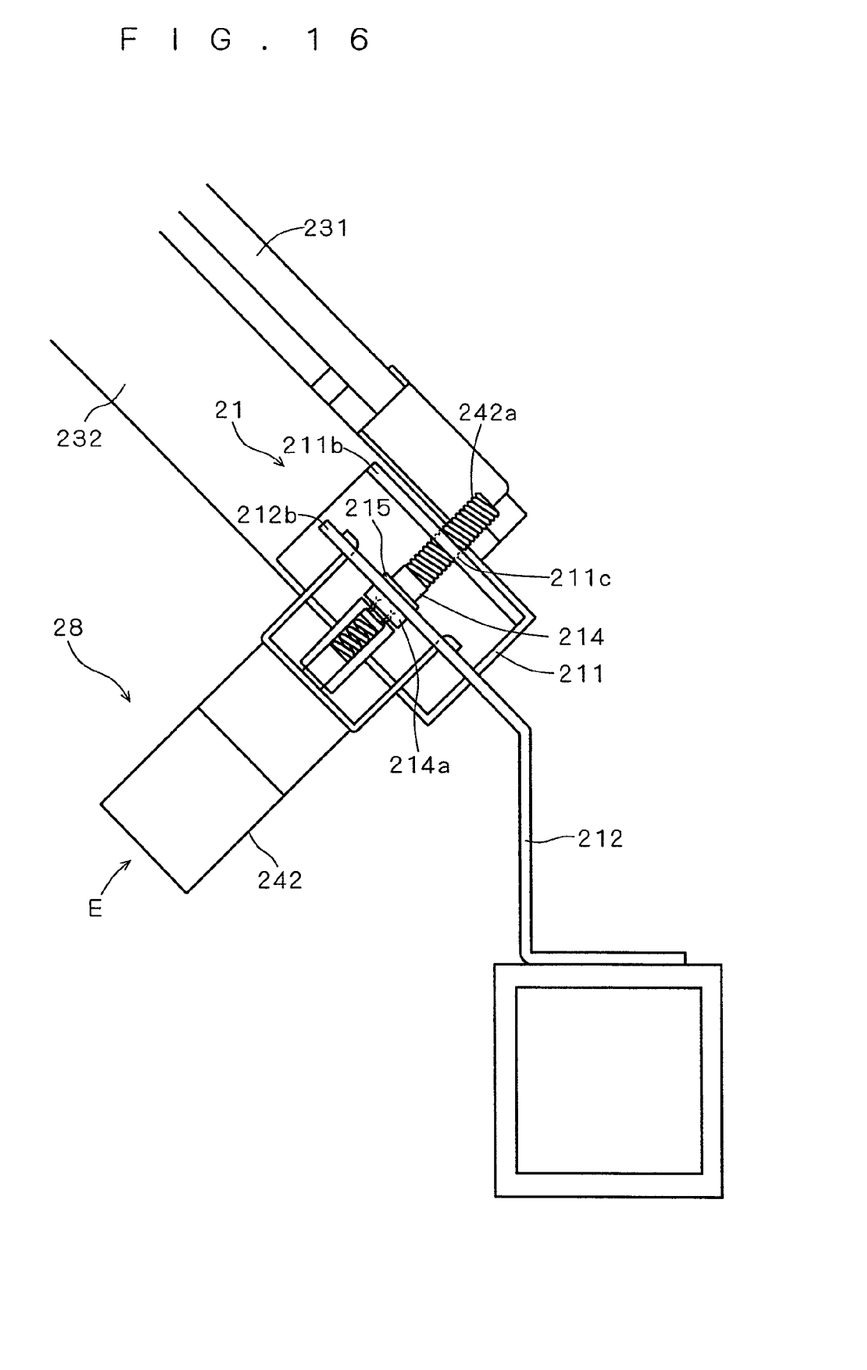
FIG. 16 is a side view of an adjustment mechanism.
Figure 17:
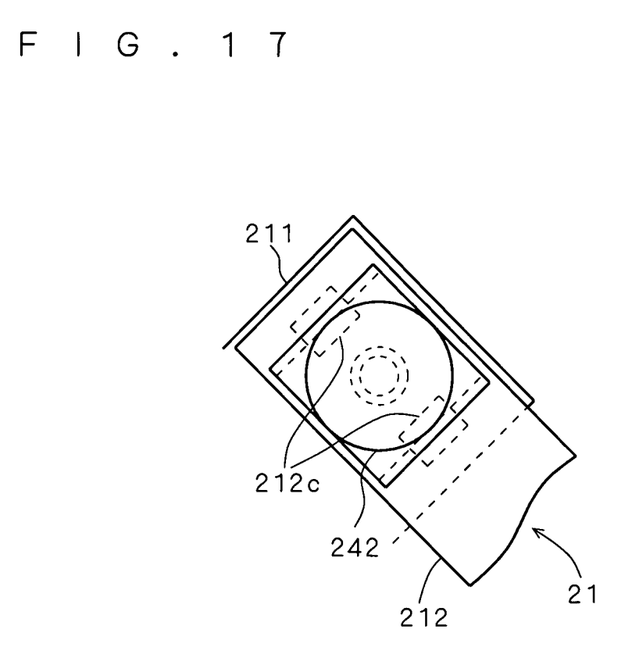
FIG. 17 is a view of the adjustment mechanism seen from the direction E shown in FIG. 16.

FIGS. 16 and 17 illustrate an adjustment mechanism 21 according to the second preferred embodiment that can be used instead of the adjustment mechanism 11 according to the first preferred embodiment. FIG. 16 is a side view corresponding to FIG. 9, and FIG. 17 is a view seen from the direction E shown in FIG. 16. Again in FIGS. 16 and 17, the elements that correspond to those elements forming the back-projection image display device 1 have the same reference numerals as those elements, but with a "2" instead of a "1" at the beginning.

Like the adjustment mechanism 11, the adjustment mechanism 21 includes a metal part 211 and a fastening metal part 212. The adjustment mechanism 21 brings the metal part 211 and the fastening metal part 212 closer to each other or moves them away from each other using rotating driving force generated by a drive unit 242, thereby moving the base frame 232 in the vicinity of one vertex of the reflection mirror 231 in a direction perpendicular to the main surface of the reflection mirror 231.

However, the adjustment mechanism 21 is different from the adjustment mechanism 11 in that a removable drive unit 28 including the drive unit 242 is removable with respect to the adjustment mechanism 21. The removable drive unit 28 is similar to the removable drive unit 27 in structure. Since the drive unit 242 used only when correcting image distortion does not need to be provided for all individuals of the back-projection image display device 1, the removable drive unit 28 is also rendered removable to simplify the back-projection image display device 1.

To make the removable drive unit 28 removable, a hexagonal-hole bolt 214 is screwed into a female screw hole 211c, with a head 214a of the hexagonal-hole bolt 214 being rotatably inserted in a round hole bored in an opposed portion 212b of the fastening metal part 212 and fastened with an E ring 215 so as not to be detached from the round hole.

The fastening metal part 212 is provided with rectangular holes 212c similar to the aforementioned rectangular holes 232c, so that the removable drive unit 28 can be attached to transmit rotation to the hexagonal-hole bolt 214.

3 Others

While the plane shape of the reflection mirror 131 has been illustrated as a trapezoid, the plane shape of the reflection mirror 131 may be a quadrangle other than a trapezoid, such as a rectangle. Alternatively, the reflection mirror 131 may have a plane shape other than a quadrangle.

Moreover, it is not necessary to transmit a control signal wirelessly using infrared radiation. A control signal may be transmitted wirelessly through electromagnetic waves or ultrasonic waves. Although it is desirable to transmit a control signal wirelessly in order to improve the degree of freedom of a place where the operation of correcting image distortion takes place so that the image distortion can be corrected easily, a control signal may be transmitted by wire through an electrical cable or optical cable which is connected between the remote control unit 144 and the control substrate 143.

The power sources that generate driving force in the drive units 141 and 142 typically use an electromagnetic motor, but may alternatively use an ultrasonic motor.

While the invention has been shown and described in detail, the foregoing description is in all aspects illustrative and not restrictive. It is therefore understood that numerous modifications and variations can be devised without departing from the scope of the invention.

What is claimed is:

1. An image distortion correcting mechanism of a back-projection image display device, said device comprising:
   a projection device which outputs image light;
   a reflection mirror which reflects said image light outputted from said projection device;
   a screen which receives said image light reflected by said reflection mirror, said image light being projected onto the back of said screen; and
   a base which holds said reflection mirror,
   said mechanism comprising:
   an adjustment unit which deforms said reflection mirror;
   a drive unit which generates driving force necessary for the deformation of said reflection mirror by said adjustment unit in response to supplied power; and
   a supply unit which supplies power to said drive unit in response to a control signal supplied from a remote control device, wherein
   said adjustment unit has a hole, said drive unit has a click part, and said drive unit is removable with respect to said adjustment unit by setting and releasing an engagement between said hole and said click part.

2. The image distortion correcting mechanism according to claim 1, wherein
   said reflection mirror has a quadrangular plane shape, and
   said adjustment unit comprises a first adjustment mechanism which brings the vicinity of the middle point of each of four sides of said reflection mirror closer to said base or moving said vicinities away from said base with the vicinity of each of four vertexes of said reflection mirror fixed to said base.

3. The image distortion correcting mechanism according to claim 2, wherein said adjustment unit comprises a second adjustment mechanism which moves said base in the vicinity of one vertex of said reflection mirror in a direction perpendicular to a main surface of said reflection mirror with said base fixed in the vicinity of each of remaining three vertexes of said reflection mirror.

4. The image distortion correcting mechanism according to claim 1, wherein said control signal is transmitted by radio.

5. A back-projection image display device, comprising:
   a projection device which outputs image light;
   a reflection mirror which reflects said image light outputted from said projection device;
   a screen which receives said image light reflected by said reflection mirror, said image light being projected onto the back of said screen;
   a base which holds said reflection mirror;
   an adjustment unit which deforms said reflection mirror;
   a drive unit which generates driving force necessary for the deformation of said reflection mirror by said adjustment unit in response to supplied power; and
   a supply unit which supplies power to said drive unit in response to a control signal supplied from a remote control device, wherein
   said adjustment unit has a hole, said drive unit has a click part, and said drive unit is removable with respect to said adjustment unit by setting and releasing an engagement between said hole and said click part.

* * * * *